United States Patent
Herren et al.

(10) Patent No.: US 12,314,159 B2
(45) Date of Patent: *May 27, 2025

(54) METHODS AND SYSTEMS FOR MOBILE BROWSER CODE TESTING

(71) Applicant: Capital One Services, LLC, McLean, VA (US)

(72) Inventors: Gregory Herren, New York, NY (US); Joseph Giardina, Golden, CO (US); Kevin Jurkowski, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,331

(22) Filed: Jan. 30, 2024

(65) Prior Publication Data
US 2024/0168870 A1    May 23, 2024

Related U.S. Application Data

(63) Continuation of application No. 17/406,542, filed on Aug. 19, 2021, now Pat. No. 11,928,050.

(51) Int. Cl.
*G06F 11/36* (2025.01)
*G06F 9/455* (2018.01)
(Continued)

(52) U.S. Cl.
CPC ...... *G06F 11/3688* (2013.01); *G06F 9/45529* (2013.01); *G06F 11/302* (2013.01);
(Continued)

(58) Field of Classification Search
CPC .... G06F 11/36; G06F 11/3688; G06F 11/302; G06F 11/3438; G06F 11/3692
See application file for complete search history.

(56) References Cited

U.S. PATENT DOCUMENTS 9,141,998 B2    9/2015   Eichstaedt et al.
9,514,475 B2 *  12/2016  Choong Cheng Shien ..................
                                                G06Q 30/0222
(Continued)

FOREIGN PATENT DOCUMENTS

GB          2591574 A     8/2021

OTHER PUBLICATIONS

Honey. "Finding Coupons in Our Mobile App." Honey, Feb. 10, 2021, help.joinhoney.com/article/337-finding-coupons-in-our-mobile-app.

(Continued)

*Primary Examiner* — Kamini B Patel
(74) *Attorney, Agent, or Firm* — Bookoff McAndrews, PLLC

(57) ABSTRACT

Disclosed are methods, systems, and non-transitory computer-readable medium for mobile browser code testing. For instance, the method may include monitoring, using a mobile application, a user interaction with the mobile application to detect a mobile browser being launched; responsive to detecting the mobile browser being launched, launching, using the mobile application, a browser user interface within the mobile application and monitoring a mobile browser session to detect a user accessing a website from a plurality of websites; responsive to detecting the user accessing the website, injecting, using the mobile application, a script into a current web page of the website in the mobile browser; testing, using the mobile browser, codes using the script in the current web page; and updating, using the mobile application, the browser user interface with a result of testing.

20 Claims, 12 Drawing Sheets

(51) Int. Cl.
    *G06F 11/30*     (2006.01)
    *G06F 11/34*     (2006.01)
    *G06F 11/3668*     (2025.01)
    *G06Q 30/0207*     (2023.01)

(52) U.S. Cl.
    CPC ...... *G06F 11/3438* (2013.01); *G06F 11/3684* (2013.01); *G06F 11/3692* (2013.01); *G06Q 30/0222* (2013.01)

(56) References Cited

U.S. PATENT DOCUMENTS

| | | | |
|---|---|---|---|
| 9,727,891 B2 * | 8/2017 | Mezzacca | G06Q 30/02 |
| 9,922,327 B2 * | 3/2018 | Johnson | G06Q 30/06 |
| 10,055,508 B1 * | 8/2018 | Specter | H04N 21/6581 |
| 10,937,046 B1 | 3/2021 | Henderson et al. | |
| 2003/0004798 A1 | 1/2003 | McAuliffe et al. | |
| 2009/0234745 A1 | 9/2009 | Ramer et al. | |
| 2011/0153401 A1 | 6/2011 | Jellema et al. | |
| 2012/0151269 A1 | 6/2012 | Park | |
| 2013/0085807 A1 | 4/2013 | Cincotta | |
| 2013/0326074 A1 | 12/2013 | He et al. | |
| 2014/0074584 A1 * | 3/2014 | Fisher | G06Q 30/0207 |
| | | | 705/14.39 |
| 2015/0020052 A1 * | 1/2015 | Saar | G06F 11/3688 |
| | | | 717/124 |
| 2016/0092339 A1 * | 3/2016 | Straub | G06F 9/44521 |
| | | | 717/124 |
| 2018/0373621 A1 * | 12/2018 | Tang | G06F 3/04883 |
| 2020/0233788 A1 * | 7/2020 | Reda | G06F 11/3692 |
| 2021/0035149 A1 * | 2/2021 | Fisher | G06Q 30/0277 |
| 2021/0125262 A1 * | 4/2021 | Corrieri | G06Q 30/0601 |
| 2021/0182892 A1 * | 6/2021 | Henderson | G06Q 30/0222 |
| 2023/0058609 A1 * | 2/2023 | Herren | G06F 11/3438 |
| 2023/0185698 A1 * | 6/2023 | Salmi | G06F 9/45558 |
| | | | 717/124 |

OTHER PUBLICATIONS

Honey. "Honey Smart Shopping Assistant." App Store, Apple, 2021, apps.apple.com/us/app/honey-smart-shopping-assistant/id1358499588?ls=1.

Honey. "What Is the Honey Smart Shopping Assistant?" Honey, May 12, 2021, help.joinhoney.com/article/216-what-is-the-honey-smart-shopping-assistant.

International Search Report and Written Opinion in Application No. PCT/US2022/040406, dated Nov. 23, 2022 (13 pages).

* cited by examiner

METHODS AND SYSTEMS FOR MOBILE BROWSER CODE TESTING

CROSS-REFERENCE TO RELATED APPLICATION(S)

This patent application is a continuation of, and claims the benefit of priority to, U.S. Nonprovisional patent application Ser. No. 17/406,542, filed on Aug. 19, 2021, the entirety of which is incorporated herein by reference.

TECHNICAL FIELD

Various embodiments of the present disclosure relate generally to methods and systems for mobile browser code testing and, more particularly, to methods and systems for injecting coupon code functionality into a web view for mobile browser code testing.

BACKGROUND

Generally, customers apply coupon or promotional codes to test the codes on e-commerce websites during a checkout process. However, testing and applying codes on e-commerce websites in mobile applications is time consuming and error prone. For instance, users may find and copy and paste or type codes into web pages of e-commerce websites to determine validity and/or apply the codes for savings. This may require navigating to several different mobile applications or user interfaces to find the codes and then return to test and/or apply the codes. This process may increase the time required to test and/or apply codes and cause errors, such as time outs, reloading errors, and/or transcription errors while typing. Therefore, a challenge may be to provide software to reduce code testing/applying time and/or errors.

Moreover, mobile shopping is generally performed on a particular mobile application that is associated with a particular e-commerce website or a general-purpose mobile browser to interact with web pages of the particular e-commerce website. However, due to constraints (e.g., security), a third party mobile application may not interact with the particular mobile application or the general-purpose mobile browser to assist users to test and apply codes. Instead, the third party mobile application may enable users to interact with web pages of the e-commerce websites in a web view of the third party mobile application. This process may cause errors (e.g., data asymmetry) between a web view layer and a third party mobile application layer. Therefore, another challenge may be to provide for coordination between the web view layer and the third party mobile application layer.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems, methods, and computer-readable medium are disclosed for mobile browser code testing.

For instance, a method may include monitoring, using a mobile application, a user interaction with the mobile application to detect a mobile browser being launched; responsive to detecting the mobile browser being launched, launching, using the mobile application, a browser user interface within the mobile application and monitoring a mobile browser session to detect a user accessing a website from a plurality of websites; responsive to detecting the user accessing the website, injecting, using the mobile application, a script into a current web page of the website in the mobile browser; testing, using the mobile browser, codes using the script in the current web page; and updating, using the mobile application, the browser user interface with a result of testing.

A system may include at least one memory storing instructions; and at least one processor executing the instructions to perform operations. The operations may include monitoring, using a mobile application, a user interaction with the mobile application to detect a mobile browser being launched; responsive to detecting the mobile browser being launched, launching, using the mobile application, a browser user interface within the mobile application and monitoring a mobile browser session to detect a user accessing a website from a plurality of websites; responsive to detecting the user accessing the website, injecting, using the mobile application, a script into a current web page of the website in the mobile browser, the script is a JavaScript bundle to execute code testing in the current web page; testing, using the mobile browser, codes using the script in the current web page; and updating, using the mobile application, the browser user interface with a result of testing.

A non-transitory computer-readable medium may store instructions that, when executed by a processor, cause the processor to perform a method. The method may include: monitoring, using a mobile application, a user interaction with the mobile application to detect a mobile browser being launched; responsive to detecting the mobile browser being launched, launching, using the mobile application, a browser user interface within the mobile application and monitoring a mobile browser session to detect a user accessing a website from a plurality of websites; responsive to detecting the user accessing the website, injecting, using the mobile application, a first test script into a current web page of the website in the mobile browser; monitoring, using the first test script in the mobile browser, the mobile browser session to detect a code test web page; responsive to detecting the code test web page, injecting a second test script into a current web page of the website in the mobile browser; testing, using the second test script in the mobile browser, codes using the second test script in the current web page to determine whether codes are valid or not; and updating, using the mobile application, the browser user interface with a result of testing.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to mobile browser code testing.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to injecting coupon code functionality into a web view for mobile browser code testing. In particular, a mobile application may enable a user to visit web pages of e-commerce websites, via a web view of a mobile browser hosted inside the mobile application. On each web page viewed in the mobile browser, the mobile application may inject at least one script to determine whether to test codes on this web page for the user. If it is decided to test codes on this web page, the injected script (or a second injected script) may test codes for the user in the web view and coordinate with the mobile application to, e.g., display a status and/or result of the testing in the web view. Therefore, the injected script may determine valid codes and apply a selected valid code on behalf of the user, while reducing errors and time required to test codes in a mobile browser.

Figure 1:
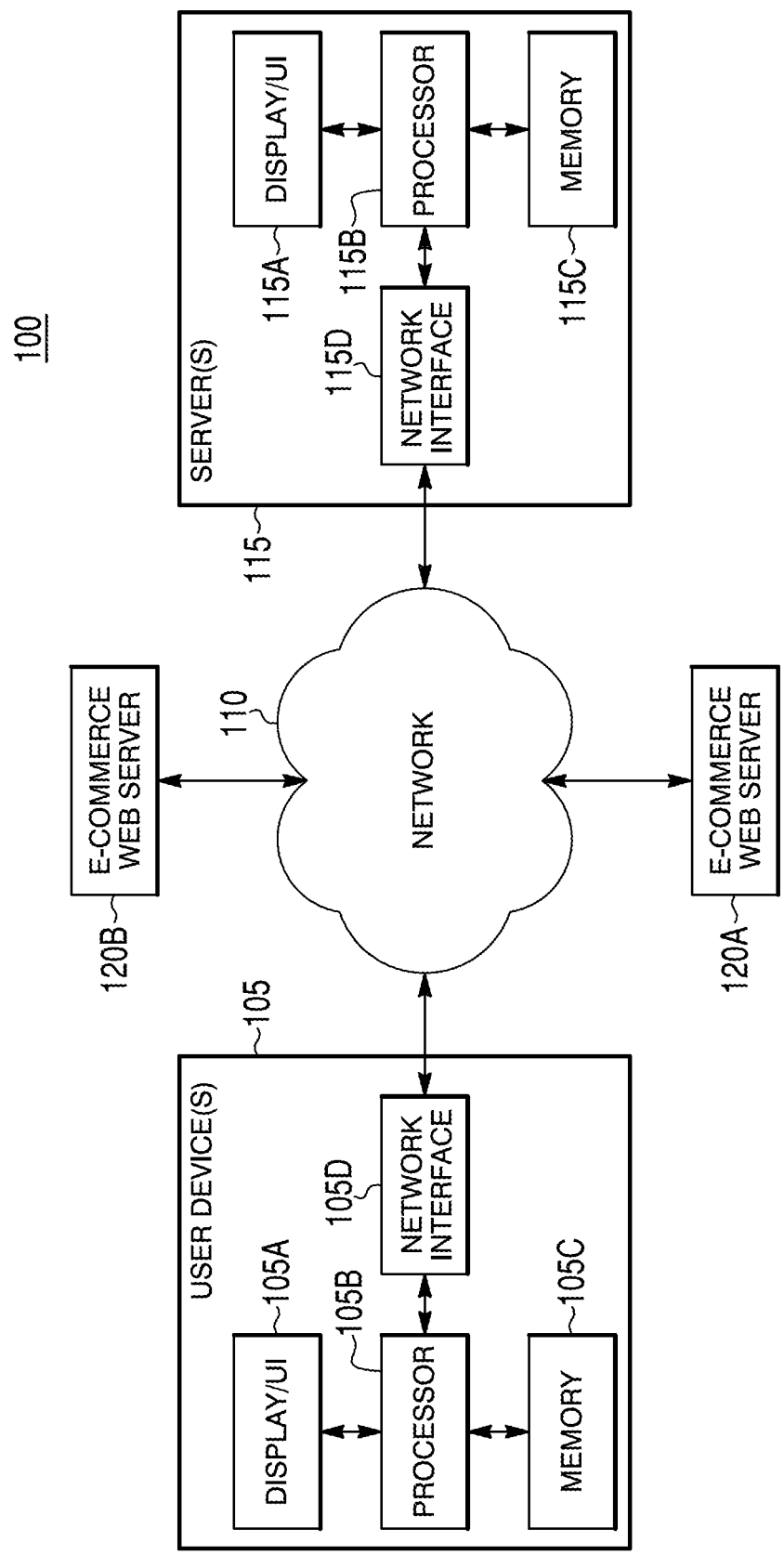
FIG. 1 depicts an exemplary system environment for mobile browser code testing, according to one or more embodiments.

FIG. 1 depicts an exemplary system 100 for mobile browser code testing, according to one or more embodiments. The system 100 may include one or more user device(s) 105 (hereinafter "user device 105" for ease of reference), a network 110, one or more server(s) 115 (hereinafter "server 115" for ease of reference), and one or more e-commerce web servers, such as, for example, e-commerce web servers 120A and 120B.

The user device 105, the server 115, and the one or more e-commerce web servers 120A and 120B may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S) and at least one instance of a code management program (each stored in memory 115C). The code management program may provide information to and/or perform processing for one or more user devices, such as the user device 105, as discussed in more detail below. The memory 115C may also store the code management program, e-commerce website information, and/or code information. The e-commerce website information may include information regarding e-commerce websites for which the user device 105 is to perform mobile browser code testing, as discussed in detail below. The code information may include information for a plurality of codes (e.g., coupon or promotional codes) associated with one or more e-commerce websites hosted by one or more of the e-commerce web servers 120A and/or 120B. The display/UI 115A may be a touch screen or a display with other input systems (e.g., mouse, keyboard, etc.) for an operator of the server 115 to control the functions of the server 115 (e.g., update the code management program, the e-commerce website information, and/or the code information). The network interface 115D may be a TCP/IP network interface for, e.g., Ethernet or wireless communications with the network 110.

The user device 105 may include a display/UI 105A, a processor 105B, a memory 105C, and/or a network interface 105D. The user device 105 may be a mobile device, such as a cell phone, a tablet, etc. The user device 105 may execute, by the processor 105B, an operating system (OS) 305 and a mobile application 307 (see FIGS. 3A and 3B). The mobile application 307 may be a customer application, a shopping application, a banking application, etc. The mobile application 307 may generate one or more graphic user interfaces (GUIs) based on instructions/information stored in the memory 105C, instructions/information received from the server 115, and/or the one or more e-commerce web servers 120A and/or 120B. The GUIs may be mobile application interfaces 405 or browser user interfaces, including web views 410 and/or code testing functionality interfaces 415 (see FIGS. 4A-4G). The mobile application interfaces 405 may display different functionalities and/or information of the mobile application 307, such as links to e-commerce websites. The web views 410 may be web pages executed based on web page documents. The web page documents may include HTML, CSS, and/or scripts, such as JavaScript. The code testing functionality interfaces 415 may display code testing elements and/or information of the mobile application 307 for mobile browser code testing. The display/UI 105A may be a touch screen or a display with other input systems (e.g., buttons, keyboard, etc.) to display the GUIs. The network interface 105D may be a TCP/IP network interface for, e.g., Ethernet or wireless communications with the network 110. The processor 105B, while executing the mobile application 307, may receive user inputs from the display/UI 105A, and perform actions or functions in accordance with the mobile application 307.

The mobile application 307 may be a software application that may be used by a user to access and interact with websites hosted by one or more of the plurality of e-commerce web servers 120A and 120B over network 110. In at least one embodiment, a user may view and interact with the websites hosted by one or more of the plurality of e-commerce web servers 120A and 120B via the mobile application 307, for example, by clicking on links or graphical user elements to view items and to place items in an electronic shopping cart.

In at least one embodiment, the mobile application 307 may include a mobile browser 309 (see FIGS. 3A and 3B) so that the user may interact with the websites hosted by the one or more of the plurality of e-commerce web servers 120A and 120B. For example, in at least one embodiment, the mobile application 307 and the mobile browser 309 cooperate to test and apply codes for a user in the mobile browser 309 by injecting coupon code functionality into web pages (displayed as a web view 410) and displaying status and/or results using the code testing functionality interfaces 415.

The mobile browser 309 may manage a web view layer, while the mobile application 307 may manage a mobile application layer. The web view layer may be an environment to manage data associated with display and interaction (e.g., user selections on, navigation between, etc.) of web pages, such as the web page documents, network requests to/from an e-commerce web server, and test results associated with the coupon code functionality. The mobile application layer may be an environment to manage data associated with display and interaction (e.g., user selections on, navigation in or out, etc.) of the mobile application 307 and/or the code testing functionality interfaces 415. The injected coupon code functionality may test and apply codes in the web view layer using testing functions of the injected coupon code functionality, while cooperating with the mobile application layer of the mobile application 307 to update the code testing functionality interfaces 415.

Figure 2:
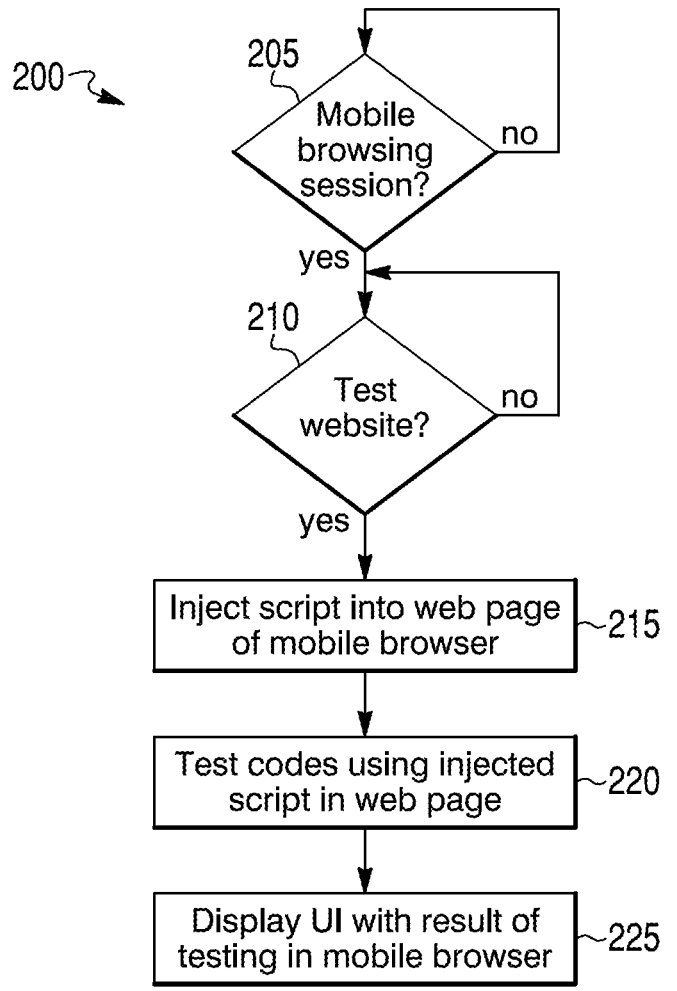
FIG. 2 depicts a flowchart for mobile browser code testing, according to one or more embodiments.

In particular, turning to FIG. 2, FIG. 2 depicts a flowchart 200 for mobile browser code testing, according to one or more embodiments. The flowchart 200 may be implemented by the mobile application 307 and the mobile browser 309 using the mobile application layer and the web view layer, respectively. The flowchart 200 may start by the mobile application 307 determining whether a mobile browsing session has been initiated (Block 205). For instance, the mobile browser 309 may detect when a user input selects a launch mobile browser element of a mobile application interface 405, to launch the mobile browser 309, and/or selects a link for a particular e-commerce website, to launch the mobile browser 309 to view (e.g., a landing page, a product page, etc. of) the particular e-commerce website. One of skill in the art would recognize that the mobile application 307 may display either and/or both the link or launch mobile browser element, in accordance with instructions/data of the mobile application 307.

In response to determining the mobile browsing session has not been initiated (Block 205: No), the mobile application 307 may proceed to return to determine whether the mobile browsing session has been initiated (Block 205). In response to determining the mobile browsing session has been initiated (Block 205: Yes), the mobile application 307 may proceed to determine whether a test website is being viewed (Block 210). For instance, the mobile application 307 may monitor the browser session and compare a domain (e.g., a second level domain of a URL) of a currently viewed web page to a plurality of website domains; determine whether there is a match between the domain and one of the plurality of website domains; if a match, determine the test website is being viewed; and, if no match, determine the test website is not being viewed. The plurality of website domains may correspond to websites hosted by e-commerce web servers 120A or 120B and are indicated as websites on which mobile browser code testing is to occur (e.g., whitelisted domains to test codes on). The plurality of website domains may be provided/updated by the server 115 based on the e-commerce website information.

One of skill in the art would recognize that Blocks 205 and 210 may be combined or arranged differently (e.g., omitted), such as in the case when the mobile application interface 405 displays links to test websites. In this case, a user input selecting a link to a test website may launch the mobile browser 309 to view a web page of the test website, thereby indicating a test website is being viewed.

In response to determining that the test website is not being viewed (Block 210: No), the mobile application 307 may return to determine whether a test website is being viewed (Block 210). In response to determining the test website is being viewed (Block 210: Yes), the mobile application 307 may proceed to inject a script into a web page of the mobile browser 309 (Block 215). For instance, the script may be a JavaScript bundle to execute testing of codes in the current web page, and the mobile application 307 may inject the script using React Native injection functionality. Generally, the script may include one or more (or all) testing functions of the injected coupon code functionality. The testing functions may include a test page function, a validity function, and an apply code function.

The test page function may monitor the browser session to determine whether a currently viewed web page is a test page. For instance, the test page function (alternatively referred to as "trigger condition functions") may analyze the web page document and determine whether one or more trigger elements are present (e.g., trigger conditions); in response to determining one or more trigger elements are present, the test page function determines a test should be executed; and in response to determining that none of the one or more trigger elements are present, the test page function determines a test should not be executed. In this manner, the injected script may reduce computation resources of the mobile application 307, without needlessly testing web pages that are not relevant to code testing. The one or more trigger elements may include one or more of a set including: a checkout page, checkout information (e.g., transaction, shipping, and/or payment information), and/or code entry fields.

The validity function may be invoked by the test page function in response to determining a test should be executed. The validity function may test each code of one or a plurality of codes (hereinafter referred to as "codes") for the e-commerce website to determine whether any of the codes are valid and, for each valid code, determine a result for a respective valid code. The codes may be provided and/or updated from the server 115 based on the code information. For instance, as discussed below, the mobile application 307 may pull a current set of codes from the server 115 for a particular e-commerce website that is currently being viewed, so that the injected validity function has a relevant set of codes to test. A valid code may cause a change in checkout information for the benefit of a user. A result may indicate a type, an amount, or other benefit of the change. The validity function may test the codes by: generating and transmitting requests (in parallel or in sequence); receiving respective responses from the e-commerce web server; and processing the responses to determine whether a code is valid and, if so, a result. The validity function may, periodically (e.g., every second, etc.) or for each code, send an update to the mobile application 307. The update may include an indication of progress (e.g., a percentage, a number of codes tested so far, etc.) and/or, if any, valid codes with corresponding results. The validity function may instead of sending the updates (or in addition to), send a result message after the last code has been tested. The result message may indicate which codes are valid (with corresponding results) and/or an indication of a code to apply. The code to apply may be selected in accordance with a selection algorithm, in accordance with known principles, e.g., highest savings, lowest shipping cost, etc., or a weighted combination of various benefits.

The apply code function may apply a code for a user in the web page. For instance, the apply code function may be invoked automatically by the selection of the code to apply, or in response a user selection of one of the valid codes. For instance, the code testing functionality interfaces 415 may display options (e.g., of valid codes and corresponding results) for a user input to select a particular code to be applied. One of skill in the art would recognize the various combinations of ways to trigger when the apply code function may be invoked, such as based on context of the user. The apply code function may transmit an applied code message to the mobile application 307, indicating a success of applying the selected (either automatically or by the user) code, and/or the applied code with a corresponding result.

Returning to FIG. 2, the mobile browser 309 may then proceed to test codes using the injected script in a web page (Block 220). In one embodiment, each of the test page function, the validity function, and the apply code function are included in the injected script. In another embodiment, only the test page function is included in the injected script (referred hereinafter as a "first test script"), while the validity function and (optionally) the apply code function are included in a follow on injected script (referred hereinafter as a "second test script"). In this case, the test page function executing in the web view layer may send a status message (e.g., indicating test is to performed or test is not to be performed for this web page) to the mobile application 307, so that mobile application 307 may inject the second test script into the current web page to execute the test. A ready status message may indicate a test is to be performed, while a not ready status message may indicate that no test is to be performed.

The mobile application 307 may then proceed to display a result of testing in mobile browser 309 (Block 225). For instance, the mobile application 307 may generate, display, and update the code testing functionality interfaces 415 based on the updates and the result message transmitted by the validity function, and/or the applied code and/or results applied by the apply code function.

Therefore, systems and methods of the present disclosure may reduce testing/applying code time, reduce time out/reload errors, reduce transcription errors, and avoid data asymmetry between the web view layer and the mobile application layer. For instance, systems and methods of the present disclosure may automatically test codes (gathered by, e.g., server 115) by injecting testing functions into web pages in the web view layer on a mobile browser 309. In this manner, the user does not need to navigate to other mobile applications, copy or remember codes, and return to a web view (which may reload or time out in the intervening time) and enter the copied or remembered code (which may be entered incorrectly). Moreover, as the web view layer and the mobile application layer coordinate (e.g., by sending updates and results from the testing functions to the mobile application 307), the mobile application 307 may avoid data asymmetry and update the code testing functionality interfaces 415 to display a current status of a testing process (e.g., a progression and/or current/final results). In this manner, the mobile application 307 may inform a user of the executing testing functions without being a part of the web view layer.

Figure 3A:
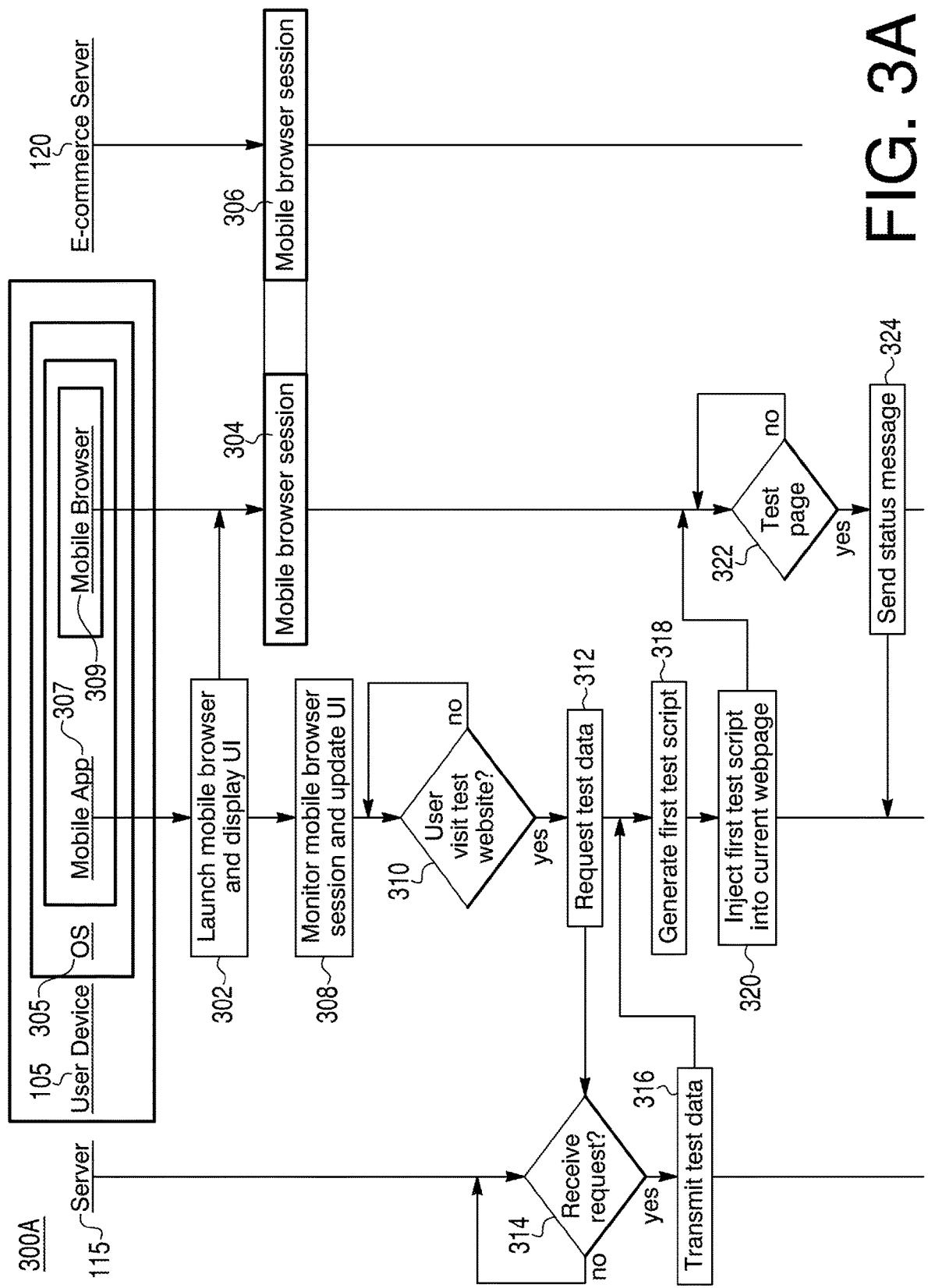
FIGS. 3A and 3B depict exemplary data flow diagrams for injecting coupon code functionality into a mobile application web browser and testing codes using the coupon code functionality, according to one or more embodiments.
Figure 3B:
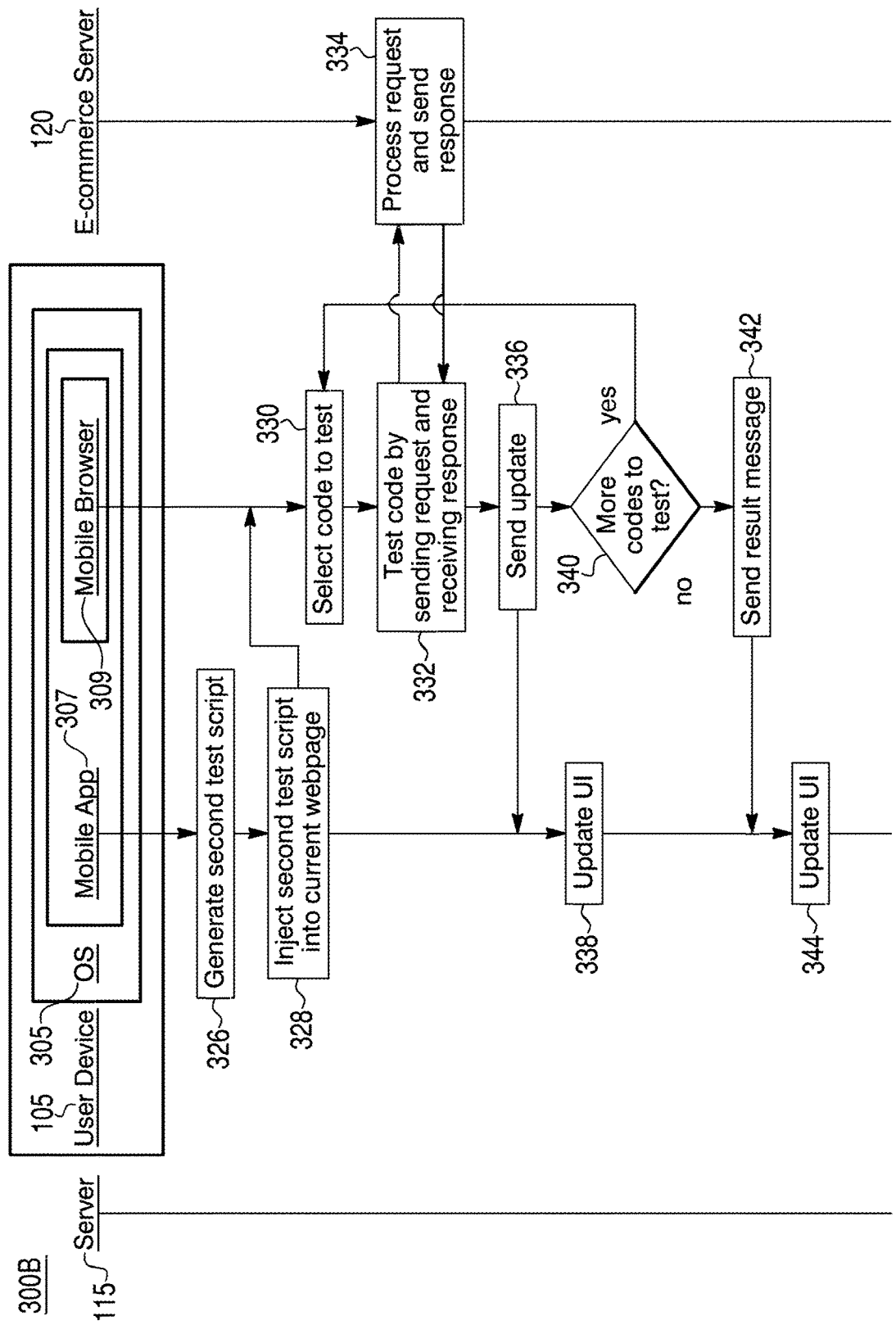
Figure 4A:
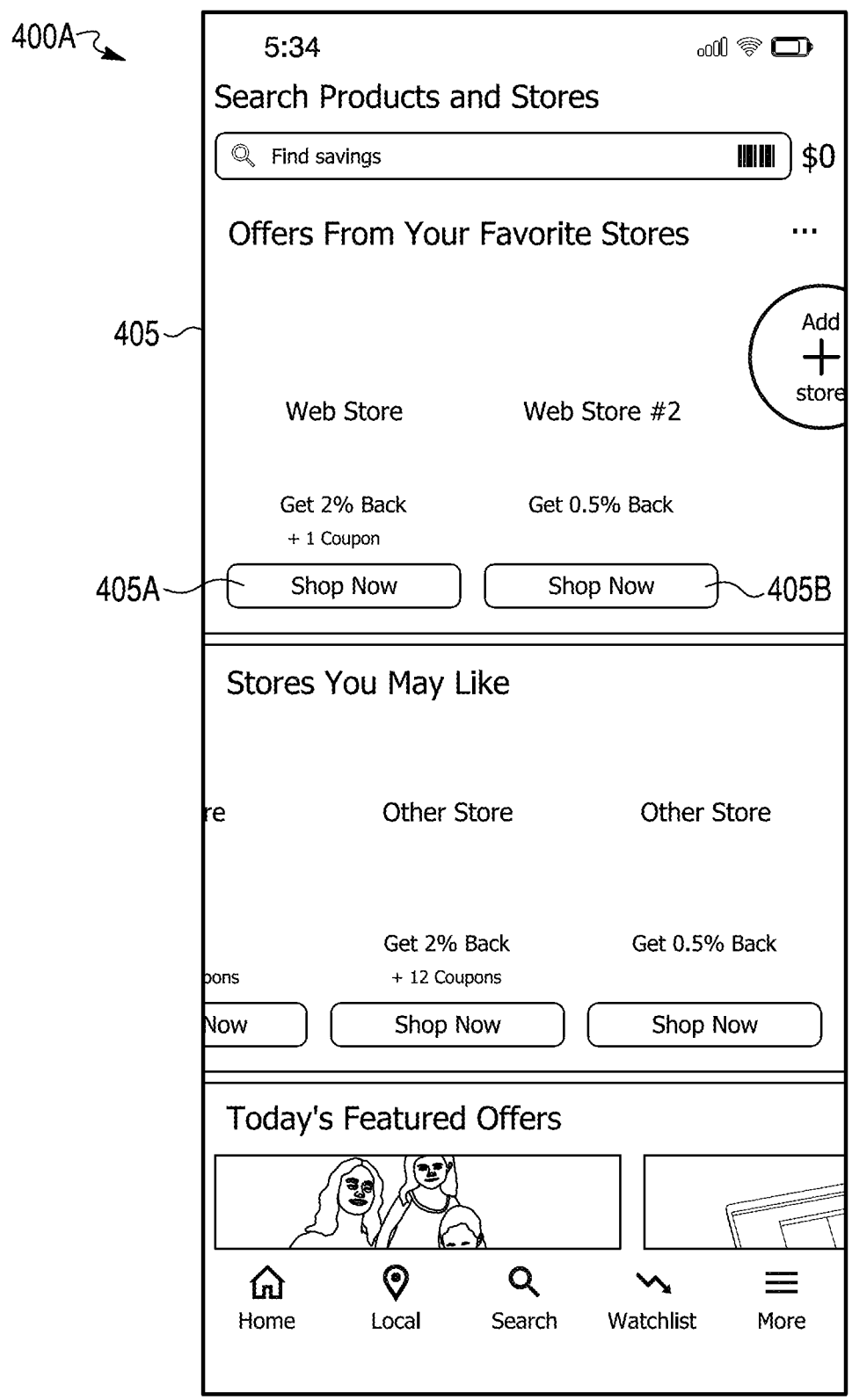
FIGS. 4A-4G depict exemplary GUIs for mobile browser code testing, according to one or more embodiments.
Figure 4B:
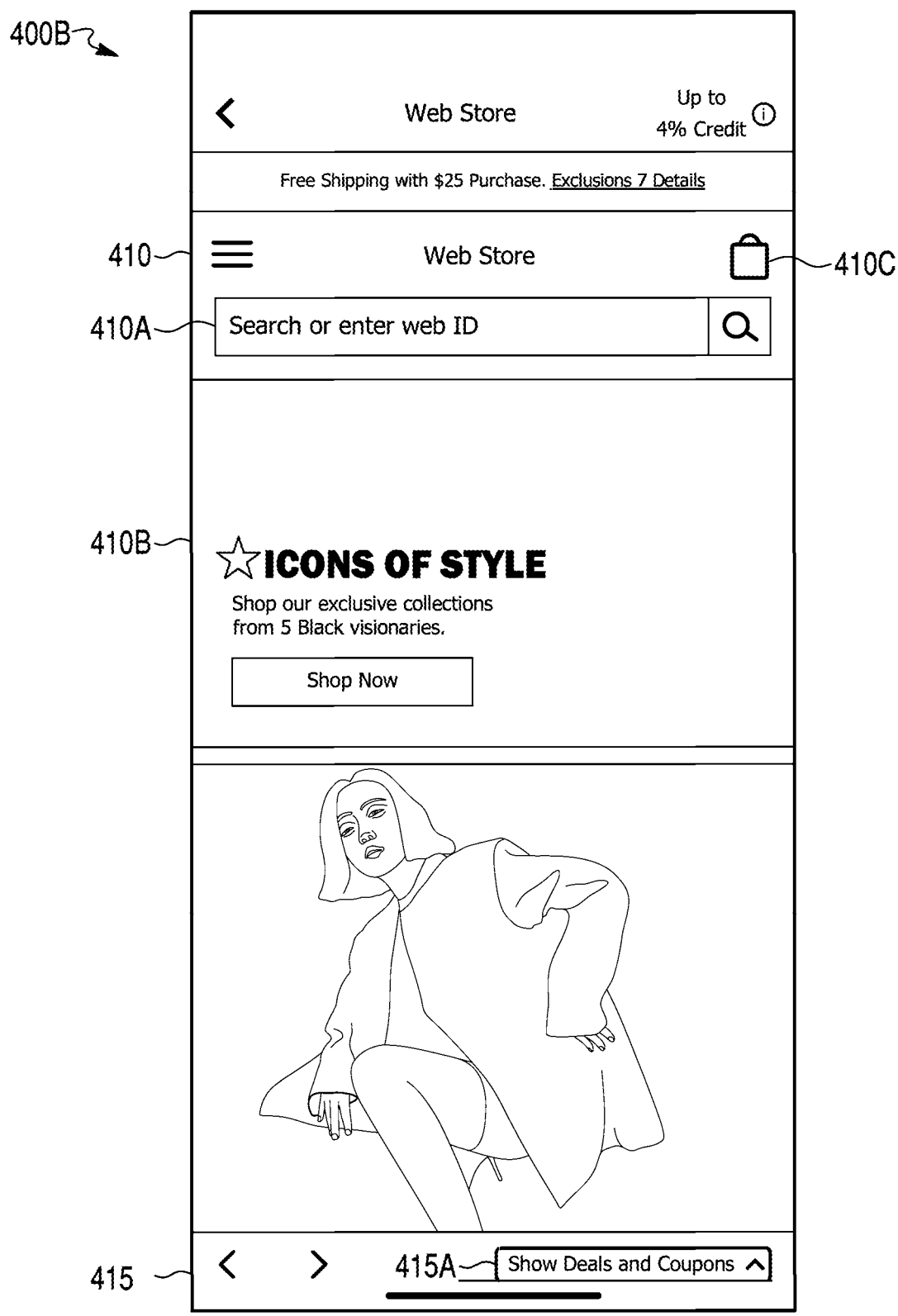
Figure 4C:
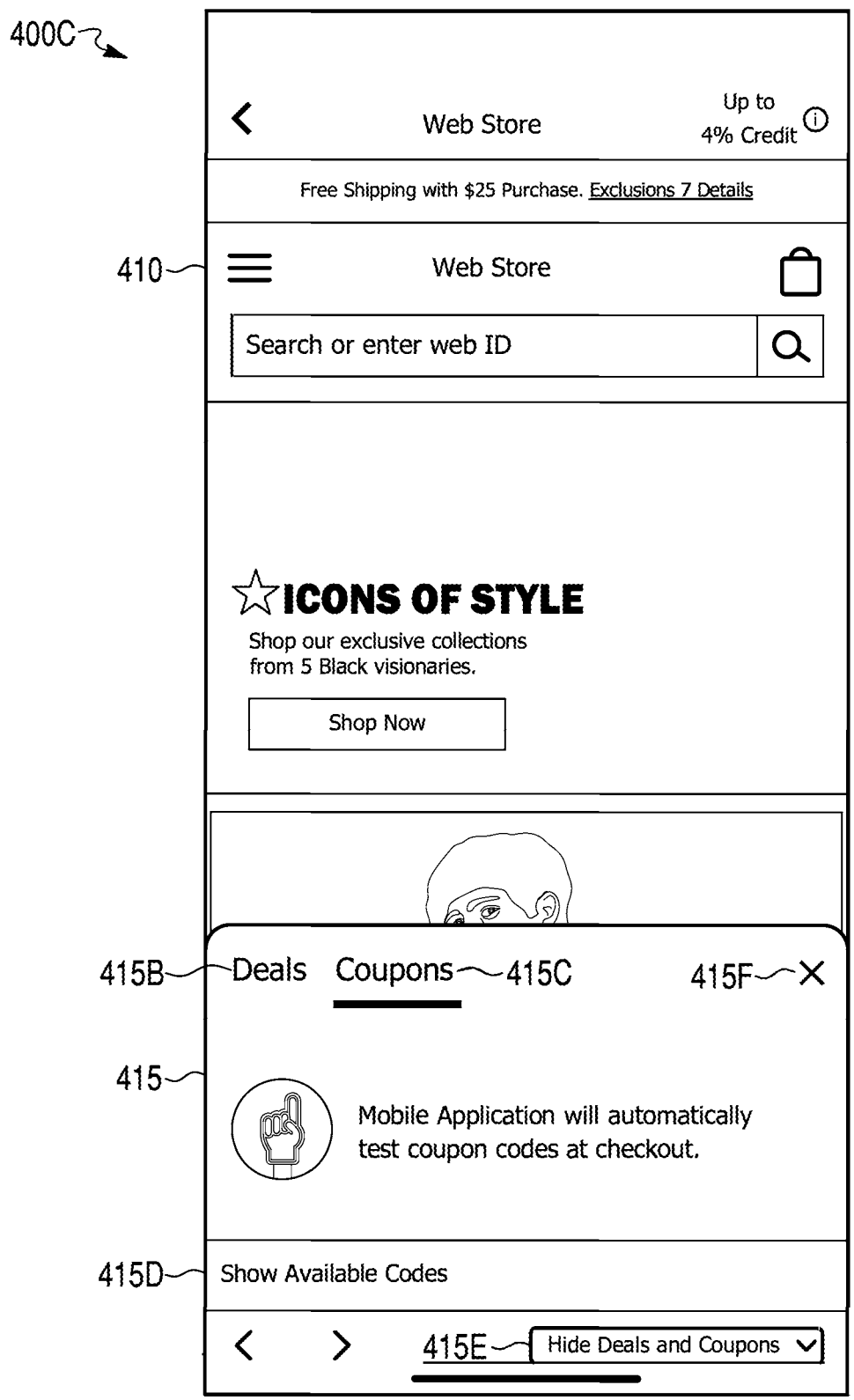
Figure 4D:
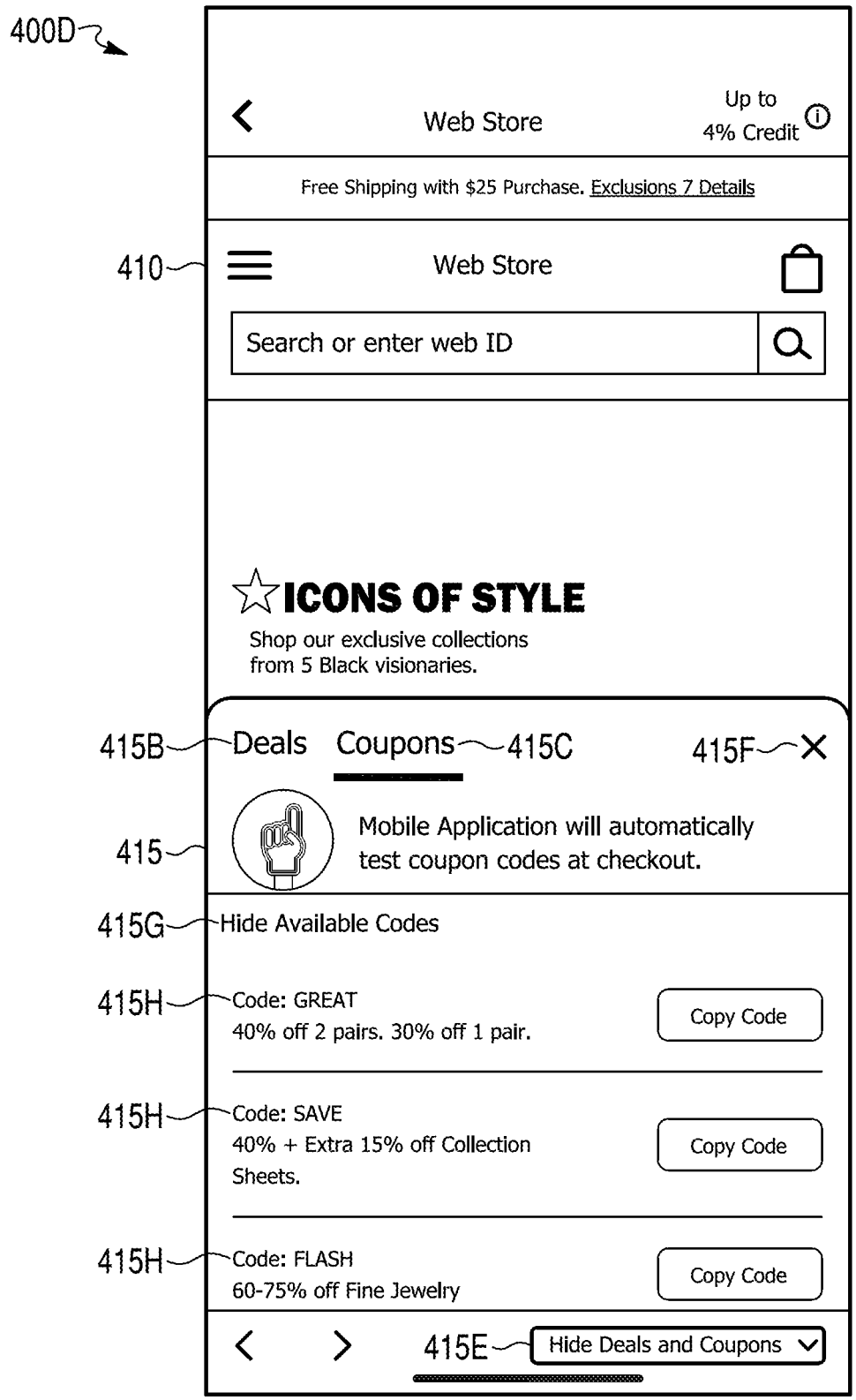
Figure 4E:
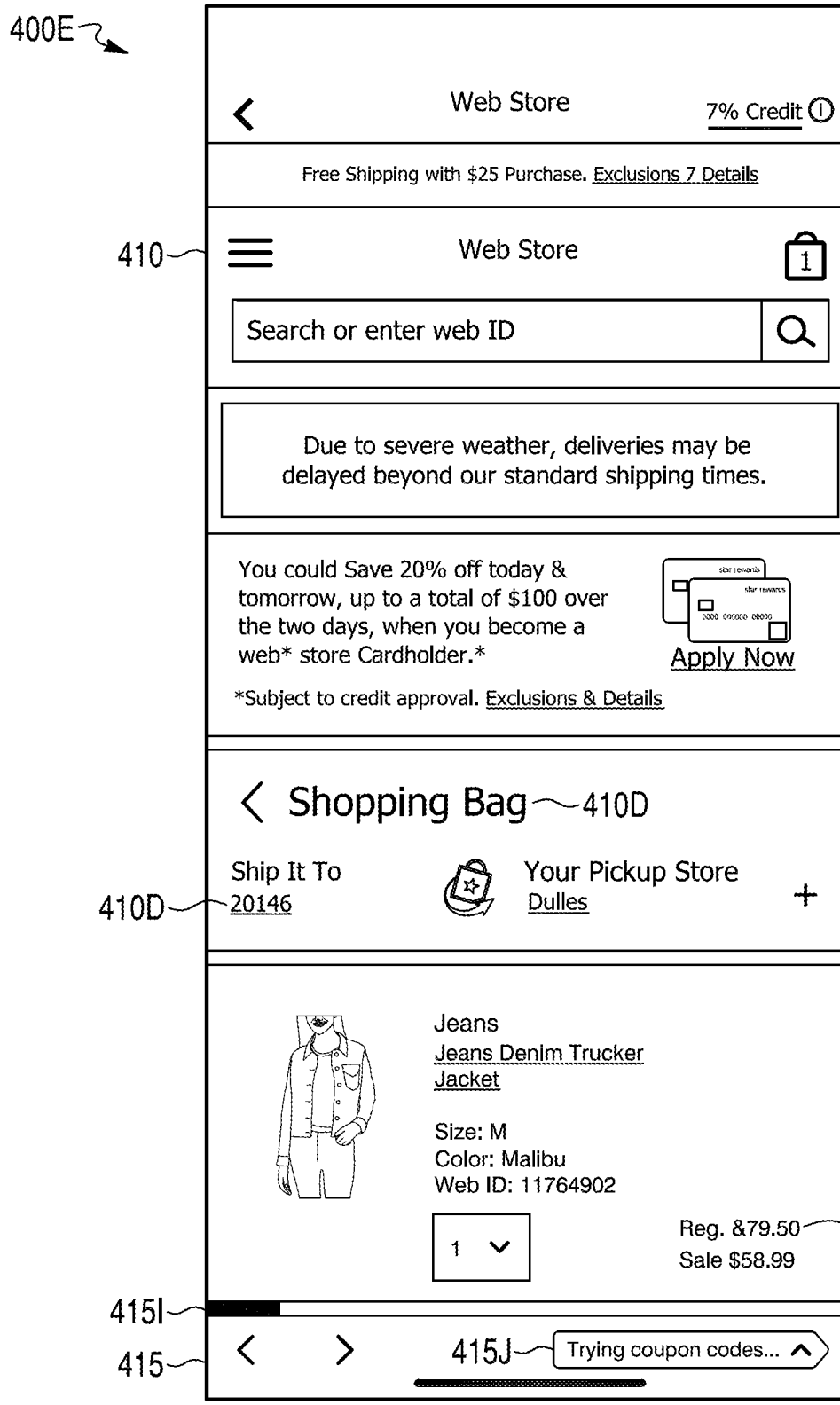
Figure 4F:
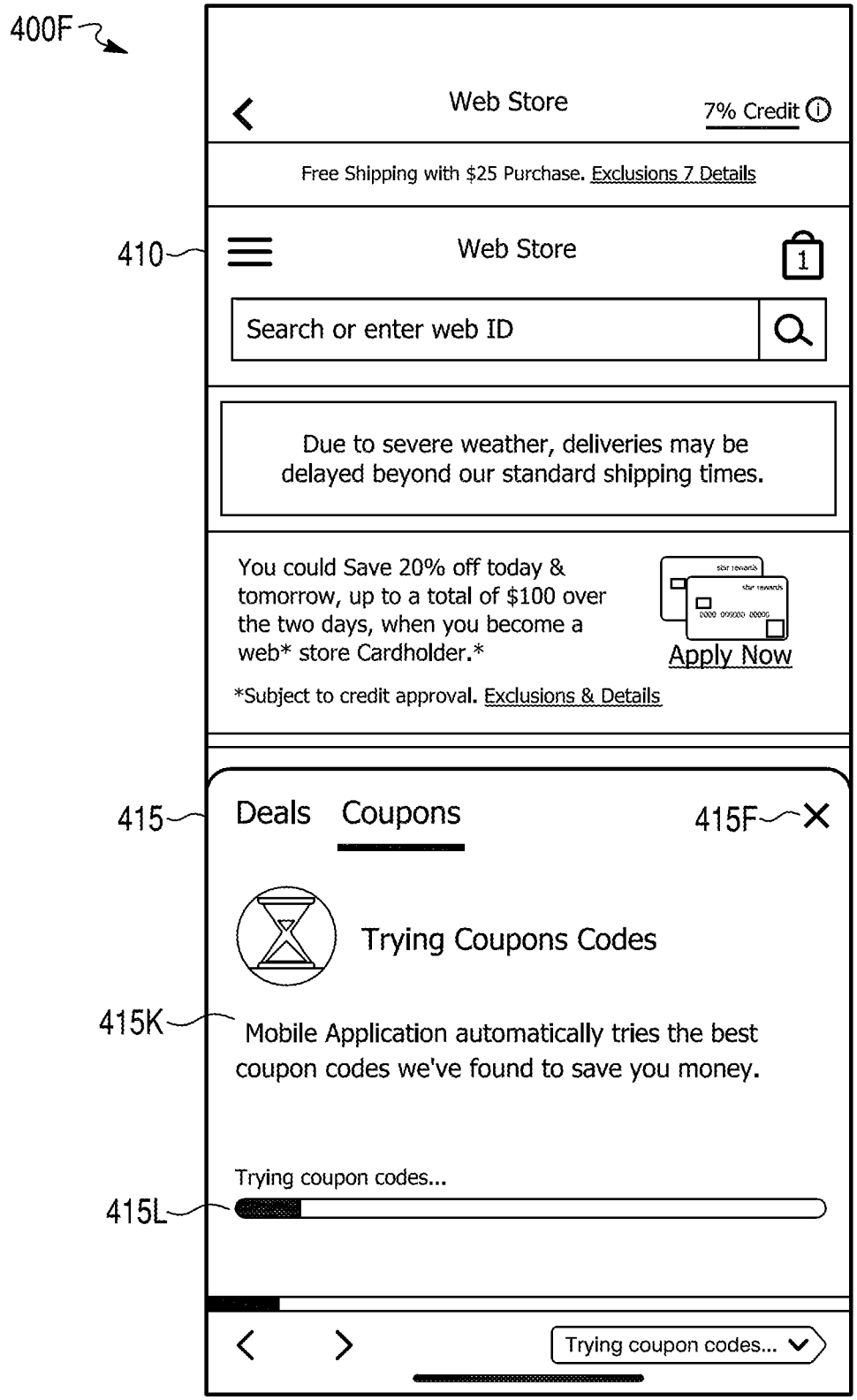
Figure 4G:
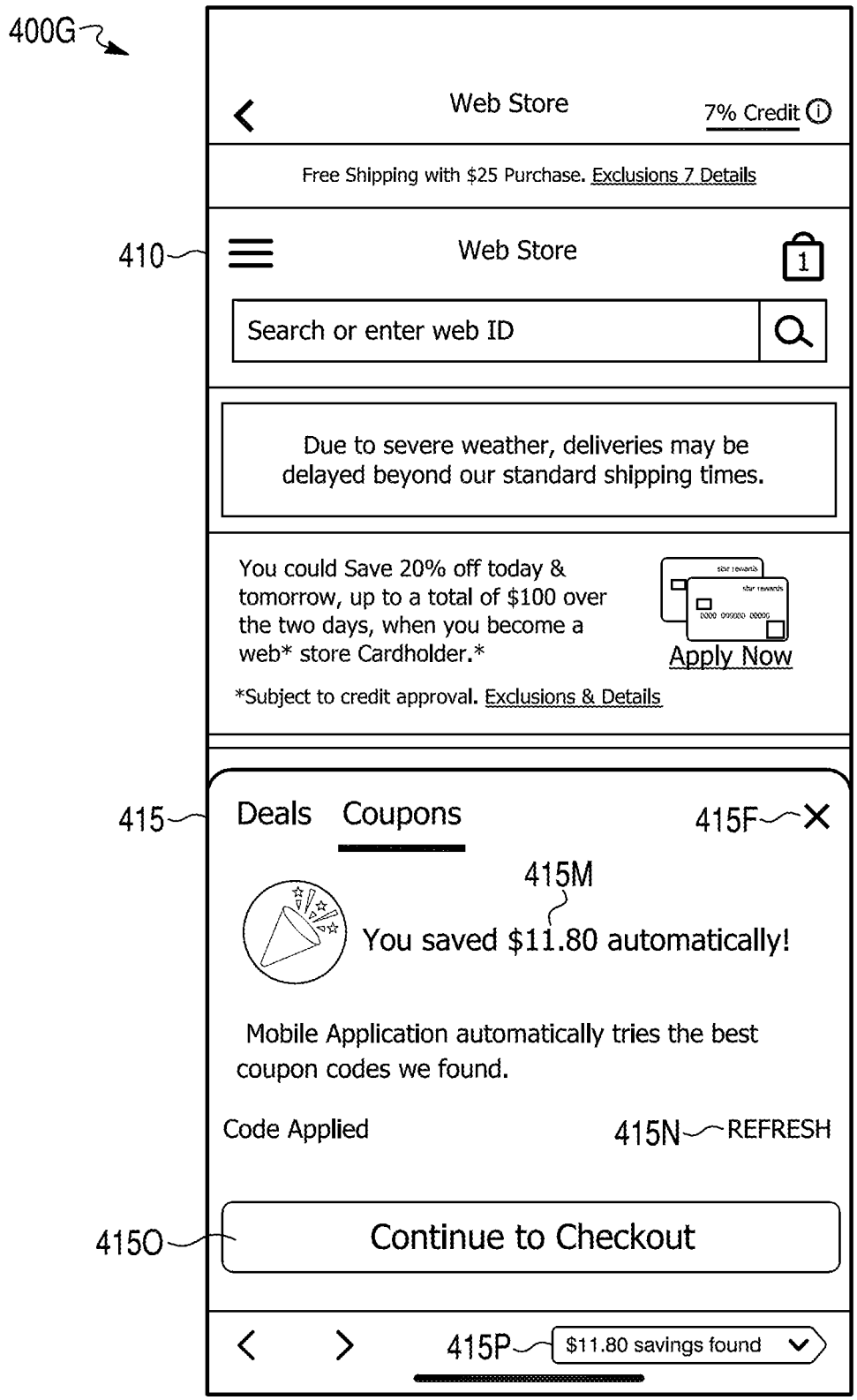

FIGS. 3A and 3B depict an exemplary data flow diagrams 300A and 300B for injecting coupon code functionality into a mobile application web browser and testing codes using the coupon code functionality, according to one or more embodiments. The data flow diagrams 300A and 300B may be implemented by the mobile application 307 and the mobile browser 309 using the mobile application layer and the web view layer, respectively, while the mobile application 307 and the mobile browser 309 interact with the server 115 and an e-commerce web server 120 (such as e-commerce web servers 120A or 120B of FIG. 1). The data flow diagrams 300A and 300B may start by the mobile application 307 launching the mobile browser 309 and displaying a browser user interface (Block 302). For instance, the browser user interface may include a web view 410 and a code testing functionality interface 415, as discussed above.

The mobile browser 309 and the e-commerce web server 120 may then coordinate a mobile browser session (Blocks 304 and 306). For instance, the mobile browser 309 and the e-commerce web server 120 may send and receive network packets (e.g., to request/provide different web pages, request/provide data regarding different configurations of products on a web page, etc.) and display/update the web view 410. While the mobile browser 309 and the e-commerce web server 120 coordinate the mobile browser session, the mobile application 307 may monitor the mobile browser session and update the browser user interface (Block 308). For instance, the mobile application 307 may monitor the domains (sub, second level, and/or top-level domains) and subdirectories (of URLs) of currently viewed web pages that are currently being displayed in the web view 410 by, e.g., examining network requests being passed to the web view layer. One of skill in the art would recognize that this could be done in other ways, such as image/text recognition of what the web view 410 is displaying.

The mobile application 307 may then proceed to determine whether a test website is being viewed (Block 310). For instance, the mobile application 307 may compare domains to the plurality of web domains, as discussed above. In response to determining the test website is not being viewed (Block 310: No), the mobile application 307 may return to determine whether a test website is being viewed (Block 310). In response to determining the test website is being viewed (Block 310: Yes), the mobile application 307 may proceed to request test data (Block 312). For instance, the mobile application 307 may generate and transmit a test data request message to the server 115. The test data request message may include an indication of the e-commerce website being viewed (e.g., the domain of the test website being viewed) and a request for test data. As discussed above, the mobile application 307 may pull the test data from the server 115. Like as mentioned above, Blocks from Block 302 through Block 310 may be combined or arranged differently (e.g., omitted), such as in the case when the mobile application interface 405 displays links to test websites. In this case, a user input selecting a link to a test website may launch the mobile browser 309 to view a web page of the test website, thereby indicating a test website is being viewed. In this case, Blocks 302-310 may be omitted, and then the data flow diagrams 300A and 300B may proceed directly to the mobile application 307 requesting the test data (Block 312).

The server 115 may receive the test data request message. Generally, the server 115 may determine whether a request has been received (Block 314). In response to determining the request has not been received (Block 314: No), the server 115 may return to determine whether a request has been received (Block 314). In response to determining the request has been received (Block 314: Yes), the server 115 may proceed to transmit the test data (Block 316). For instance, the server 115 may extract the indicated domain from the test data request message; generate a test data message; and transmit the test data message to the mobile application 307. The test data message may include a current set of codes from the server 115 for the e-commerce website that is indicated by the test data request message. The test data message may include instructions for the testing functions to be used with the e-commerce website. For instance, the instructions for the testing functions may indicate (or include) particular types of test page functions, validity functions, and/or apply code functions for the particular e-commerce website, depending on what types of test page elements to check for and how to test and apply codes on this particular e-commerce website.

The mobile application 307 may receive the test data message. In response to receiving the test data, the mobile application 307 may then proceed to generate the first test script (Block 318). For instance, the mobile application 307 may package the test page function of the testing functions as a JavaScript bundle, as discussed above.

The mobile application 307 may then proceed to inject the first test script into the current webpage (Block 320). For instance, the mobile application 307 may inject the first test script using the React Native injection functionality, as discussed above. Generally, the mobile application 307 may monitor the mobile browser session and, for each new web page loaded into the web view 410, inject the first test script into the new web page, so that as a user navigates the website each web page is injected with the first test script.

The mobile browser 309 may proceed to determine whether a current web page is a test page (Block 322). For instance, the mobile browser 309 may determine whether one or more trigger elements are present in the current web page, as discussed above. In response to determining the current web page is not a test page (Block 322: No), the mobile browser 309 may return to determine whether a current web page is a test page (Block 322). For instance, the mobile browser 309 may execute the test page function and determine whether to execute a test process using the validity function. As one of skill in the art would recognize, as each new web page is injected with the first test script, the mobile browser 309 may check each new web page and determine whether to execute a test process using the validity function. In response to determining the current web page is a test page (Block 322: Yes), the mobile browser 309 may proceed to send a status message to the mobile application 307 (Block 324). For instance, the status message may indicate that the current web page is a test page and that a test process should proceed. Additionally, although not depicted in FIG. 3A, the mobile browser 309 may transmit a status message in response to determining the current web page is not a test page (Block 322: No), so that the mobile application 307 is informed that a test process should not proceed. In this case, the status message may indicate that the current web page is not a test page and that a test process should not proceed.

Turning to FIG. 3B, the mobile application 307 may receive the status message. In response to receiving the status message, the mobile application 307 may then proceed to generate the second test script (Block 326). For instance, the mobile application 307 may package the validity function and/or the apply code function of the testing functions, and the plurality of codes to test, as a JavaScript bundle, as discussed above.

The mobile application 307 may then proceed to inject the second test script into the current web page (Block 328). For instance, the mobile application 307 may inject the second test script using the React Native injection functionality, as discussed above. Generally, the mobile application 307 may inject the second test script whenever a received status message indicates a test should proceed.

Generally, Blocks from Block 330 through Block 342 may depict the data flow diagrams 300A and 300B as the validity function is executed, in conjunction with the e-commerce web server 120 and the mobile application 307. The mobile browser 309 may then proceed to select a code to test (Block 330). For instance, the mobile browser 309 may select a code randomly from the plurality of codes, or select the code in order of a ranking based on likelihood to be valid and/or largest benefit possible. One of skill in the art would recognize that the selection of a code to test could be done several ways. The mobile browser 309 may then proceed to test the selected code by sending a request and receiving a response from the e-commerce web server 120 (Block 332), while the e-commerce web server 120 processes the request and sends a response (Block 334). The mobile browser 309 may then proceed to send an update to the mobile application 307 (Block 336). For instance, the mobile browser 309 may send an update to the mobile application 307, as discussed above.

The mobile application 307 may receive the update. The mobile application 307 may then proceed to update the browser user interface (Block 338). For instance, the mobile application 307 may update the code testing functionality interface 415 to display a current progression of the test process, based on the update.

Returning to the mobile browser 309, the mobile browser 309 may then proceed to determine whether there are more codes to test (Block 340). In response to determining there are more codes to test (Block 340: Yes), the mobile browser 309 may return to select a code to test (Block 330). In response to determining there are no more codes to test (Block 340: No), the mobile browser 309 may proceed to send a result message to the mobile application 307 (Block 342).

The mobile application 307 may receive the result message. The mobile application 307 may then proceed to update the browser user interface (Block 344). For instance, the mobile application 307 may update the code testing functionality interface 415 to display a result of the test process, based on the result message.

While not depicted in data flow diagrams 300A and 300B, the apply code function (if packaged in the second test script) may apply a code for web view layer. For instance, the apply code function may be invoked automatically by a selection of a code to apply, or in response a user selection of one of the valid codes. Therefore, the data flow diagrams 300A and 300B may reduce errors and reduce time to test and apply codes for users in a mobile browser 309.

FIGS. 4A-4G depict exemplary GUIs 400A-400G for mobile browser code testing, according to one or more embodiments. In GUI 400A, the mobile application 307 may display a mobile application interface 405. The mobile application interface 405 may display one or more links 405A and 405B to e-commerce websites. The one or more links 405A and 405B to e-commerce websites may be selectable by a user input to launch a mobile browser 309, so the user may view and interact with a corresponding e-commerce website hosted by an e-commerce web server, such as one of e-commerce web servers 120A or 120B.

In GUI 400B, the mobile application 307 may launch the mobile browser interface in response to a user input selecting one of the one or more links 405A and 405B. The mobile browser interface may include a web view 410 (generated by the mobile browser 309) and a code testing functionality interface 415 (generated and managed by the mobile application 307). In this case, the web view 410 may correspond to a landing page of an e-commerce website that includes a plurality of elements, such as a search element 410A, link(s) to other pages 410B, and a link to a shopping cart/bag 410C. The plurality of elements may be selectable by a user during a mobile browsing session to navigate the e-commerce website to view different web pages, etc. One of skill in the art would recognize that the content of the web page might vary in structure and content. In one embodiment a script is injected that includes all of the testing functions, while in other embodiments only the first test script (including the test page function) may be injected. The code testing functionality interface 415 may display a first menu element 415A. The first menu element 415A may be selectable by a user input to cause a first window to display information regarding, among other things, codes to be used with this particular e-commerce website.

In GUI 400C, the mobile application 307 may display the first window of code testing functionality interface 415 in response to a user input on the first menu element 415A. The mobile application 307 may update the code testing functionality interface 415 to include a link to other information 415B, a link to code information 415C (currently being displayed), a second menu element 415D, a third menu element 415E, and/or an exit element 415F. The other information 415B may be, e.g., information about deals relating to the e-commerce website, but could be information regarding the mobile application 307 or how the code testing process works, etc. The link to code information 415C (currently being displayed) may appear as a header indicating it is currently being viewed but when the other information 415B is being displayed it may be a link to toggle back to the current display. The second menu element 415D may be a toggle element to display a list of codes 415H relevant to the current e-commerce website, in response to a user input. The third menu element 415E and the exit element 415F may be selectable by a user input to close the first window of code testing functionality interface 415.

In GUI 400D, the mobile application 307 may display the list of codes 415H relevant to the current e-commerce website in response to a user input on the second menu element 415D. The mobile application 307 may update the first window to display the list of codes 415H along with a fourth menu element 415G. The fourth menu element 415G may be selectable by a user input to close the display of the list of codes 415H within the first window of code testing functionality interface 415.

In GUI 400E, the mobile application 307 may display the browser user interface after the user has interacted with several web pages and is now on a new web page in the web view 410. In particular, the mobile application 307 may have injected the script in each web page visited to determine whether to start a test process. In this case, the mobile browser 309, using the test page function, may analyze the web page, including a plurality of web page elements 410D, to determine whether one or more trigger elements are present. In this case, the test page function returns a determination that this is a test page and that a test should proceed. In some embodiments, the validity function is already injected and may start testing immediately (and, in this case, sending updates), in other embodiments the test page function sends a status message to inform the mobile application 307 to start a test process (e.g., by injecting the second test script). The mobile application 307 may update the code testing functionality interface 415 to display a progress indicator 415I and a fifth menu element 415J. The progress indicator 415I may depict a representation of how many codes or time to completion of the testing process. The progress indicator 415I may be based on the updates received from the validity function or it may be an estimate based on average times to complete a testing for this e-commerce website and/or for a number of codes to be tested. The fifth menu element 415J may be selectable by a user input to display a second window of the code testing functionality interface 415, to display information regarding the code test process.

In GUI 400F, the mobile application 307 may display the second window of the code testing functionality interface 415 in response to a user input on the fifth menu element 415J. The mobile application 307 may update the code testing functionality interface 415 to include text information 415K and/or a second progress indicator 415L. The text information 415K may display information about the code test process. The second progress indicator 415L may be the same or different from the progress indicator 415I.

In GUI 400G, the mobile application 307 may display a third window of the code testing functionality interface 415 in response to receiving a result message and/or an applied code message. The mobile browser 309 may update the code testing functionality interface 415 to include benefit information 415M, particular code information 415N, checkout element 415O, and/or sixth menu element 415P. The benefit information 415M and the particular code information 415N may correspond to a best code or an applied code, and may indicate a benefit achieved/available for the benefit information 415M and alphanumeric string corresponding to the code that provides the benefit. The checkout element 415O may be selectable by a user input to proceed to a checkout window with/without the code applied. The sixth menu element 415P may be selectable by a user input to close the third window of code testing functionality interface 415, such as so the user may proceed with browsing the e-commerce website.

Figure 5:
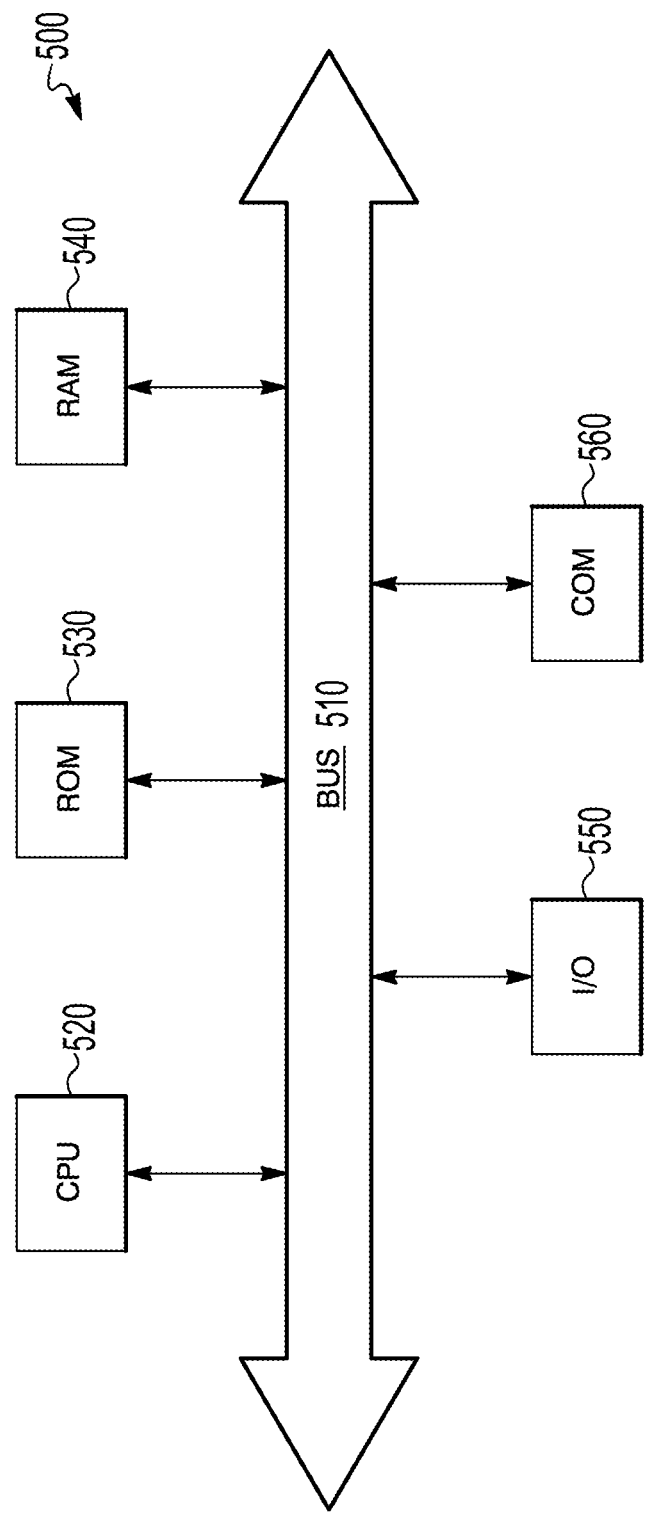
FIG. 5 depicts an exemplary system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for promotional code testing, the computer-implemented method comprising:
    detecting, using a mobile application, a mobile browser within the mobile application, wherein the mobile browser manages a web view layer;
    injecting, using the mobile application, a script into a current web page in the mobile browser; and
    testing, using the mobile browser, promotional codes using the script in the current web page;
    wherein the web view layer and the mobile application cooperate to manage interactions associated with a promotional code testing functionality, and
    wherein the mobile application is not an add-on to the mobile browser.

2. The computer-implemented method of claim 1, wherein the script is a JavaScript bundle to execute testing the promotional codes in the current web page, the script including a test page function, a validity function, and an apply promotional code function.

3. The computer-implemented method of claim 1, wherein the current web page is one of a plurality of websites, wherein the plurality of websites are websites whitelisted to perform promotional code testing in the mobile browser.

4. The computer-implemented method of claim 1, further comprising, using the mobile application, before injecting the script:
    transmitting a request for test data to a server;
    receiving the test data from the server;
    generating a first test script; and injecting, using the mobile application, the first test script into the current web page.

5. The computer-implemented method of claim 4, wherein the first test script includes trigger condition functions to detect web pages to start testing the promotional codes.

6. The computer-implemented method of claim 4, wherein testing, using the mobile browser, the promotional codes includes:
- monitoring, using the first test script in the mobile browser, the mobile browser to detect a promotional code test web page; and
- responsive to detecting the promotional code test web page, sending, using the first test script in the mobile browser, a ready status message to the mobile application.

7. The computer-implemented method of claim 6, further comprising:
- responsive to receiving the ready status message, generating, using the mobile application, a second test script; and
- injecting, using the mobile application, the second test script into the current web page.

8. The computer-implemented method of claim 7, wherein the second test script includes promotional code testing functions and a plurality of promotional codes to be tested, the promotional code testing functions including a first function to select promotional codes of the plurality of promotional codes to test and a second function to communicate with the current web page to test the promotional codes.

9. The computer-implemented method of claim 7, further comprising:
- selecting, using the mobile browser, a promotional code of a plurality of promotional codes to test;
- testing, using the mobile browser, the promotional code by transmitting a request to the current web page and receiving a response; and
- sending, using the mobile browser, an update message to the mobile application.

10. The computer-implemented method of claim 9, further comprising:
- responsive to receiving the update message, updating a user interface to indicate testing is in progress based on the update message, and
- responsive to receiving a result message, updating the user interface to indicate testing is complete based on the result message.

11. A method for testing promotional codes in a mobile environment, comprising:
- initiating a session in a mobile application;
- determining, by the mobile application, whether a web page within the session is eligible for testing;
- in response to the determination, injecting, by the mobile application, a script into the web page;
- executing, using the mobile application, the script to test one or more codes on the web page;
- generating, using the mobile application, results based on the execution of the script; and
- causing, using the mobile application, a display of the results on a graphical user interface,
- wherein the mobile application is not an add-on to a mobile browser.

12. The method of claim 11, wherein the script comprises a JavaScript bundle configured to interact with elements of the web page.

13. The method of claim 11, further comprising updating, by the mobile application, the graphical user interface in real-time as results are generated.

14. The method of claim 11, wherein determining whether a web page is eligible for testing includes comparing a domain of the web page with a list of predetermined domains stored within the mobile application.

15. The method of claim 11, wherein the one or more codes comprise promotional codes for discounts, offers, or rewards applicable to e-commerce transactions.

16. The method of claim 11, further comprising receiving, by the mobile application, the one or more codes from a remote server.

17. The method of claim 11, wherein the mobile application is configured to inject the script into multiple web pages concurrently during the session.

18. The method of claim 11, wherein the results include a determination of a validity and effectiveness of each tested code.

19. The method of claim 11, further comprising enabling, via the graphical user interface, user selection of a specific code from the results for application to a transaction.

20. A method for testing promotional codes within a mobile application, comprising:
- causing, by a mobile application, display of an interface, the interface including links to one or more web pages, where selecting a link launches a selected web page in a mobile browser;
- injecting a script into the selected web page;
- causing, by the mobile application, display of a promotional code testing interface in the mobile browser;
- causing, by the mobile application, display of a list of promotional codes and one or more progress indicators in the promotional code testing interface; and
- causing, by the mobile application, display of one or more results from testing the promotional codes, and one or more options for code application upon completion of the testing,
- wherein the mobile application is not an add-on to the mobile browser.

* * * * *